US012663158B2

(12) United States Patent
Park

(10) Patent No.:  US 12,663,158 B2
(45) Date of Patent:  Jun. 23, 2026

(54) COOKING APPLIANCE AND CONTROL METHOD THEREFOR

(71) Applicant: LG ELECTRONICS INC., Seoul (KR)

(72) Inventor: Yunsik Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 18/270,788

(22) PCT Filed: Jul. 29, 2021

(86) PCT No.: PCT/KR2021/009912
§ 371 (c)(1),
(2) Date: Jul. 3, 2023

(87) PCT Pub. No.: WO2022/145612
PCT Pub. Date: Jul. 7, 2022

(65) Prior Publication Data
US 2024/0053025 A1      Feb. 15, 2024

(30) Foreign Application Priority Data
Jan. 4, 2021     (KR) ........................ 10-2021-0000251

(51) Int. Cl.
*F24C 7/08*          (2006.01)
*F24C 15/00*        (2006.01)
(Continued)

(52) U.S. Cl.
CPC ............ *F24C 7/085* (2013.01); *F24C 15/006* (2013.01); *G06T 7/73* (2017.01); *H04N 7/183* (2013.01);
(Continued)

(58) Field of Classification Search
CPC ........ F24C 7/085; F24C 3/128; F24C 15/006; F24C 15/16; F24C 15/008; G06T 7/73;
(Continued)

(56) References Cited

U.S. PATENT DOCUMENTS

2016/0296055 A1*  10/2016  Schilling ................. F24C 7/085
2017/0115008 A1*   4/2017  Erbe ........................ F24C 7/081
(Continued)

FOREIGN PATENT DOCUMENTS

DE      10 2013 110 642 A1     3/2015
DE      10 2013 114 227 A1     6/2015
(Continued)

OTHER PUBLICATIONS

DE 102014210673 with Machine Translation (Year: 2015).*
DE 102016119230 with Machine Translation (Year: 2018).*

*Primary Examiner* — Allen R. B. Schult
*Assistant Examiner* — Amy E Carter
(74) *Attorney, Agent, or Firm* — Birch, Stewart, Kolasch & Birch, LLP

(57) ABSTRACT

The present disclosure relates to a cooking appliance and a control method therefor, and, particularly, to a cooking appliance using heat, such as an oven, and a control method therefor. The present disclosure may comprise: a main body; a cooking chamber provided inside the main body to have one open surface, and including a plurality of steps supporting the position of a rack in which food to be cooked is accommodated; a camera module provided to the upper part of the cooking chamber to estimate the position of the rack in which food to be cooked is accommodated, and including a camera for generating a captured image by capturing the position of the rack in which food to be cooked is accommodated inside the cooking chamber; and a cooling fan which is arranged at one side of the camera module and
(Continued)

which cools down the camera module by suctioning external air.

15 Claims, 7 Drawing Sheets

(51) Int. Cl.

| | | |
|---|---|---|
| F24C 15/16 | (2006.01) | |
| G06T 7/73 | (2017.01) | |
| H04N 7/18 | (2006.01) | |
| H04N 23/57 | (2023.01) | |
| H04N 23/67 | (2023.01) | |
| H04N 23/69 | (2023.01) | |

(52) U.S. Cl.
CPC ............. H04N 23/67 (2023.01); H04N 23/69 (2023.01); *F24C 15/16* (2013.01); *H04N 23/57* (2023.01)

(58) Field of Classification Search
CPC ........ H04N 7/183; H04N 23/67; H04N 23/69; H04N 23/57; H04N 7/185
See application file for complete search history.

(56) References Cited

U.S. PATENT DOCUMENTS

| | | | | |
|---|---|---|---|---|
| 2018/0058702 A1 * | 3/2018 | Jang | ......................... | F24C 7/081 |
| 2018/0324908 A1 * | 11/2018 | Denker | ................ | H05B 6/6467 |
| 2020/0166276 A1 | 5/2020 | Garuccio et al. | | |
| 2021/0341152 A1 * | 11/2021 | Johnson | .................. | F24C 15/04 |

FOREIGN PATENT DOCUMENTS

| | | | | | | |
|---|---|---|---|---|---|---|
| DE | 102014210673 A1 | * | 12/2015 | ............. | F24C 7/085 |
| DE | 102016119230 A1 | * | 4/2018 | ............. | F24C 15/16 |
| EP | 3 708 911 A1 | | 9/2020 | | |
| JP | 2008-298299 A | | 12/2008 | | |
| JP | 6364607 B2 | | 8/2018 | | |
| JP | 2019-184141 A | | 10/2019 | | |
| JP | 2020-91217 A | | 6/2020 | | |
| KR | 10-2010-0134427 A | | 12/2010 | | |
| KR | 20100134427 A | * | 12/2010 | ............. | F24C 7/085 |
| KR | 10-2018-0025787 A | | 3/2018 | | |
| WO | WO 2012/062890 A3 | | 5/2012 | | |
| WO | WO-2012062890 A2 | * | 5/2012 | ............. | F24C 15/16 |
| WO | WO 2015/185608 A1 | | 12/2015 | | |
| WO | WO 2018/225866 A1 | | 12/2018 | | |

* cited by examiner (c)

(a)     22

(b)

COOKING APPLIANCE AND CONTROL METHOD THEREFOR

CROSS REFERENCE TO RELATED APPLICATIONS

This application is the National Phase of PCT International Application No. PCT/KR2021/009912, filed on Jul. 29, 2021, which claims priority under 35 U.S.C. 119(a) to Patent Application No. 10-2021-0000251, filed in the Republic of Korea on Jan. 4, 2021, all of which are hereby expressly incorporated by reference into the present application.

TECHNICAL FIELD

The present disclosure relates to a cooking appliance and a control method therefor and, more particularly, to a cooking appliance using heat, such as an oven, and a control method therefor.

BACKGROUND ART

In general, cooking appliances may refer to products for cooking food using electricity or other energy (e.g., gas) at home or indoors.

These cooking appliances include a cooking appliance using gas as a heat source, such as a gas range, a gas oven, or a gas oven range, and a cooking appliance using electricity as a heat source, such as an induction range or a microwave oven, and a cooking appliance combining an induction range using electricity and a gas oven using gas.

While cooking using such a cooking appliance, a cooking chamber of the cooking appliance is closed, and thus, a function of providing an image of the cooking chamber during cooking may be provided by a camera mounted in the cooking chamber.

Video monitoring images of a cooking appliance equipped with a camera that has been released up to now have problems in that a monitoring area is limited or image quality varies depending on the position of a shelf (rack) due to a fixed angle of view and a capture area of the camera.

Specifically, the cooking appliance equipped with the camera may have restrictions on usability of a monitoring function according to the position of the shelf (rack). In general, when a fixed angle of view is used, monitoring is advantageous when the shelf (rack) is located at the bottom. Cooking appliance products released so far provide usability when the shelf (rack) is located at a lower part.

For effective cooking, in some cases, there may be a recommended position of the shelf (rack) according to food ingredients or cooking modes. However, when the position of the shelf (rack) is at the top, a video monitoring function may not be used.

In addition, in an example of actual use of a monitoring image according to the position of the shelf (rack), a capture area becomes narrower and illuminance decreases as the rack is positioned closer to the top, resulting in deterioration in usability.

Therefore, a method for solving these problems is required.

DISCLOSURE

Technical Problem

To solve the above problems, an object of the present disclosure is to provide a cooking appliance capable of estimating the position of a shelf (rack) of a cooking chamber of the cooking appliance, and a control method therefor.

Another object of the present disclosure is to provide a cooking appliance capable of obtaining an optimal image by operating a camera at a set angle of view and a set focus, and a control method therefor.

Another object of the present disclosure is to provide a cooking appliance capable of obtaining an accurate monitoring image that is not affected by a shelf (rack), and a control method therefor.

Furthermore, another purpose of one embodiment of the present disclosure is to solve various problems not mentioned herein. A person skilled in the art may understand this via entire contents of the present document and drawings.

Technical Solution

To solve the above problem, according to an embodiment of the present disclosure, an angle of view and a focus of a camera may be adjusted to provide an optimal image for a camera focus and a capture area at the position of a corresponding shelf and a captured image may be displayed on a product and a display of a user equipment, by automatically recognizing the position of an oven shelf through image-based feature recognition.

Therefore, the position of a rack may be sensed based on image-based feature recognition in a cooking chamber of an oven and an angle of view and a focus of a camera suitable for the position may be automatically set such that the quality of a video image is maintained and a capture area is secured for monitoring of images at various positions of a rack.

According to an aspect of the present disclosure, provided herein is a cooking appliance, including a main body; a cooking chamber provided inside the main body to be opened on one side and including a plurality of supports supporting a position of a rack on which a cooking material is placed; a camera module provided above the cooking chamber to estimate the position of the rack on which the cooking material is placed and including a camera configured to generate a captured image by capturing the position of the rack on which the cooking materials inside the cooking chamber are placed; and a cooling fan disposed on one side of the camera module and configured to cool the camera module by drawing in external air.

The camera module may be installed in an electrical compartment above the cooking chamber, and the electrical compartment may be spatially separated from the cooking chamber.

The cooking appliance may further include a first glass provided on an upper wall of the cooking chamber to cause the camera module to capture an inside of the cooking chamber and configured to block heat inside the cooking chamber from being transferred to the camera; and a second glass disposed between the camera and the first glass and configured to block heat transferred to the camera.

A space between the first glass and the second glass may be sealed by a gasket.

The cooking appliance may further include a controller configured to control the camera module.

The controller may transmit the captured image to a user equipment.

The controller may estimate the position of the rack on which the cooking material is placed based on image recognition using an image captured for a specific region.

The controller may estimate the position of the rack on which the cooking material is placed using a lighting reflection signal from among the captured image.

The controller may set at least one of an angle of view or a focus of the camera according to the estimated position of the rack.

The specific region may be a lighting unit inside the cooking chamber.

In another aspect of the present disclosure, provided herein is a cooking appliance, including a main body; a cooking chamber provided inside the main body to be opened on one side and including a plurality of supports supporting a position of a rack on which a cooking material is placed; a camera module provided above the cooking chamber to estimate the position of the rack on which the cooking material is placed and including a camera configured to generate a captured image by capturing the position of the rack on which the cooking materials inside the cooking chamber are placed; and a controller configured to control the camera module. The controller may estimate the position of the rack on which the cooking material is placed based on image recognition using the captured image and set at least one of an angle of view or a focus of the camera according to the estimated position of the rack.

The controller may transmit the captured image to a user equipment.

The controller may estimate the position of the rack on which the cooking material is placed based on image recognition using the captured image.

The controller may estimate the position of the rack on which the cooking material is placed using a lighting reflection signal from among the captured images.

Advantageous Effects

According to an embodiment of the present disclosure, the position of a shelf (rack) may be estimated through image-based feature recognition of a cooking chamber of a cooking appliance.

In addition, at least one of an angle of view and a focus of a camera may be set to match an estimated position of a shelf (or a rack).

Thereafter, the camera may operate with the set angle of view and the set focus to obtain an image, and the image may be transmitted to a user equipment or may be displayed on a display of a cooking appliance.

Therefore, usability may be improved compared to an image monitoring function of an existing fixed view angle and focus method. Accordingly, an optimal video image according to the position of the shelf (rack) may be provided.

In addition, the shelf (rack) on which cooking materials (food ingredients) are placed in the cooking appliance may be effectively estimated.

In addition, an accurate image may be obtained regardless of cooking materials (food ingredients) by recognizing an image of a lighting unit that is not affected by the rack (or shelf).

Furthermore, according to another embodiment of the present disclosure, there are additional technical effects not mentioned herein. A person skilled in the art may understand this via the entire contents of the present document and drawings.

BEST MODE

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining at least two or more drawings are also within the scope of the present disclosure.

In addition, when an element such as a layer, region or module is described as being "on" another element, it is to be understood that the element may be directly on the other element or there may be an intermediate element between them.

Figure 1:
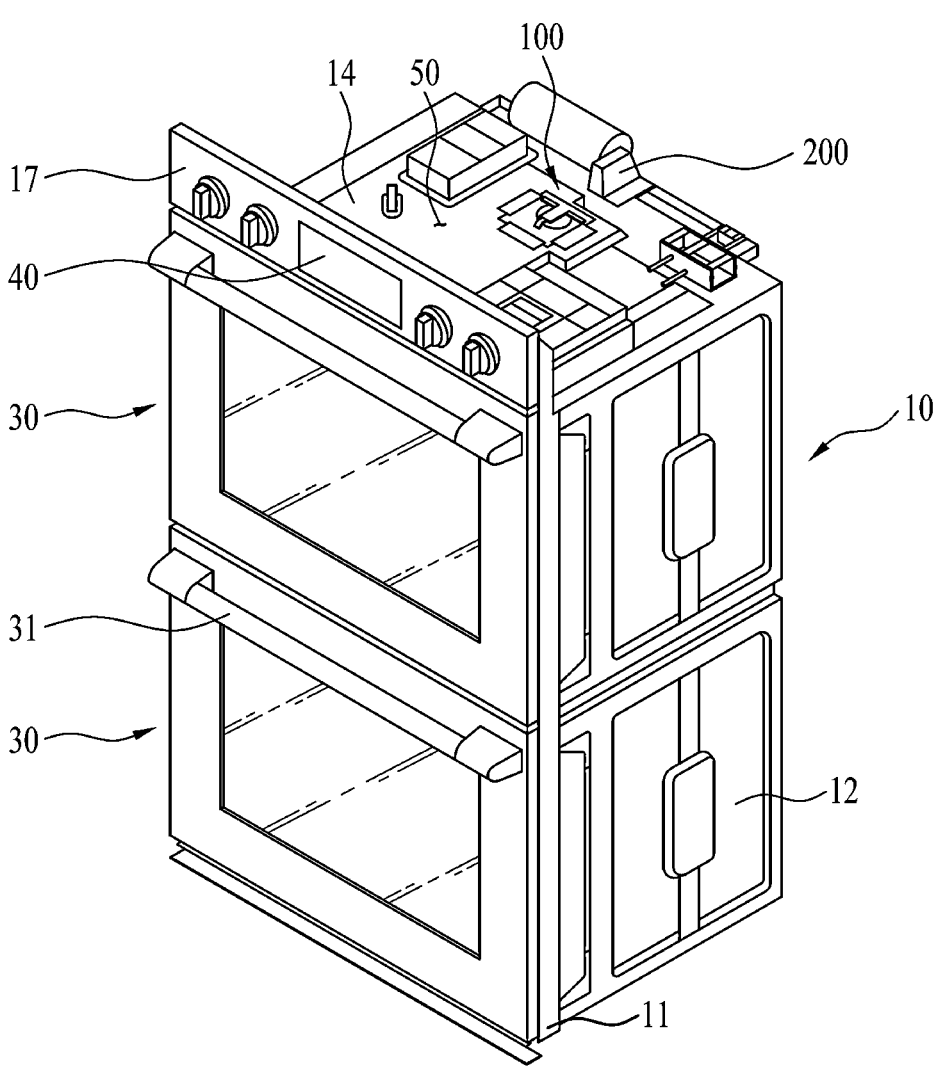
FIG. 1 is a perspective view of a cooking appliance according to an embodiment of the present disclosure.
Figure 2:
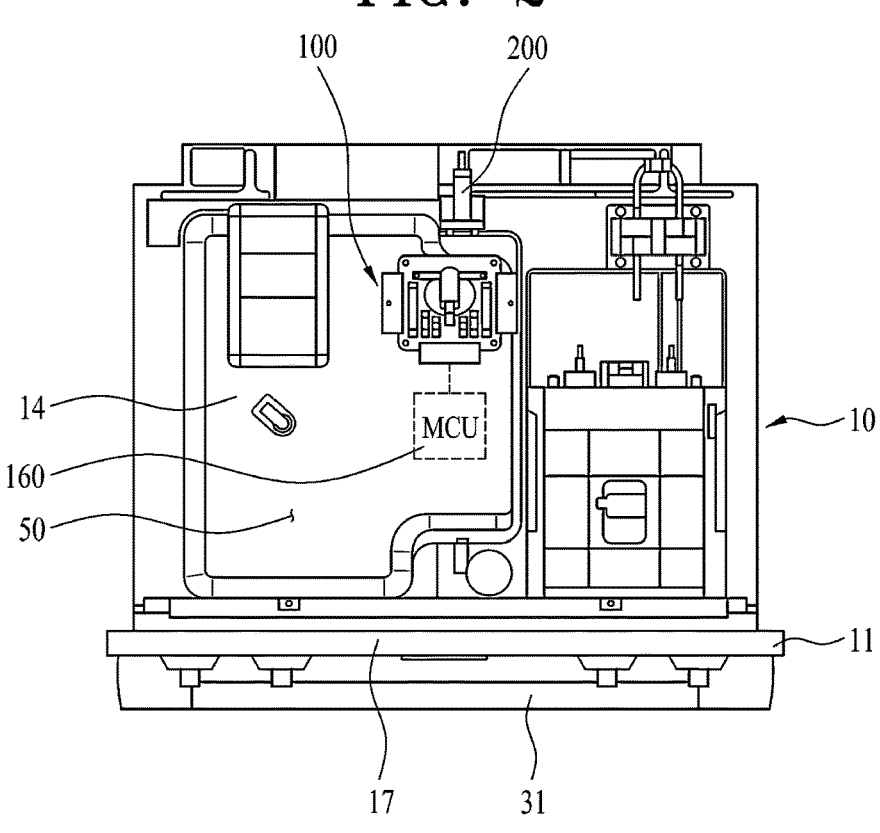
FIG. 2 is a plan view of a cooking appliance according to an embodiment of the present disclosure.
Figure 3:
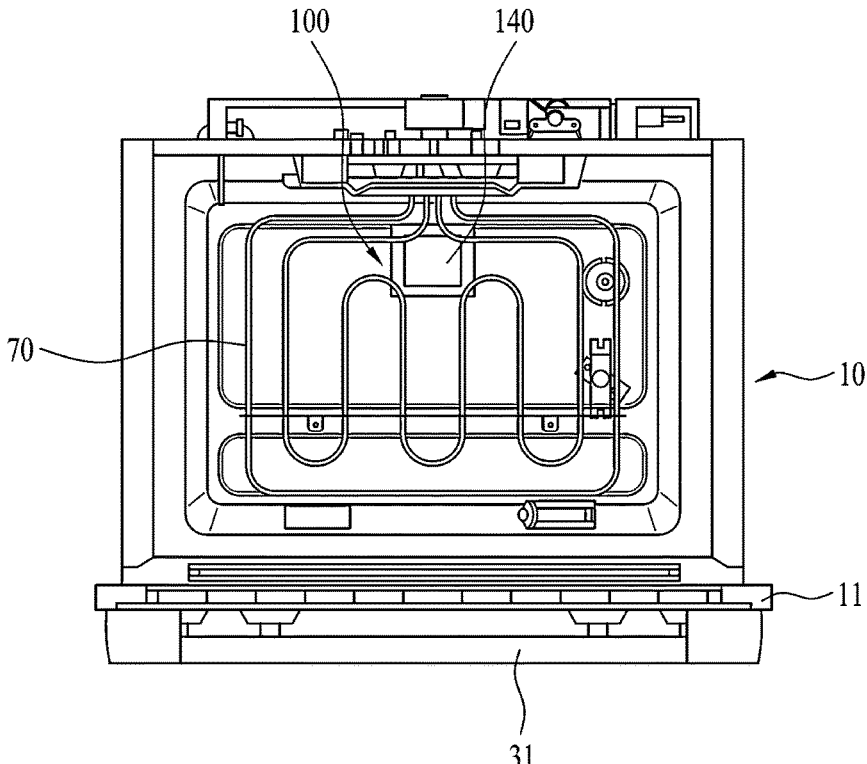
FIG. 3 is a bottom view of a cooking appliance according to an embodiment of the present disclosure.

FIG. 1 is a perspective view of a cooking appliance according to an embodiment of the present disclosure. FIG. 2 is a plan view of a cooking appliance according to an embodiment of the present disclosure. FIG. 3 is a bottom view of a cooking appliance according to an embodiment of the present disclosure.

Referring to FIGS. 1 to 3, the cooking appliance may include a main body 10 forming an outer appearance, a cooking chamber 20 provided inside the main body 10 such that the front thereof is open, a door 30 provided on the front of the main body 10 to open and close the cooking chamber 20, and a camera module 100 installed above the cooking chamber 20 to capture the interior of the cooking chamber 20.

The camera module 100 may be installed in an electrical compartment 50 above the cooking chamber 20. FIG. 1 illustrates a state in which the electrical compartment 50 is open. A cooktop (not shown) on which a cooking container is seated may be provided on the electrical compartment 50. An upper panel (not shown) covering the electrical compartment 50 may be positioned.

The electrical compartment 50 is provided above the cooking chamber 20. A heat insulating material (not shown) for insulating the electrical compartment 50 and the cooking chamber 20 may be provided between the electrical compartment 50 and the cooking chamber 20 to prevent heat of the cooking chamber 20 from being transferred to the electrical cabinet 50.

In addition, other electrical components including a controller (or microcontroller unit (MCU)) 160 for controlling the cooking appliance may be installed in the electrical compartment 50. Although FIG. 2 shows a state in which the camera module 100 is connected to the controller 160, a separate controller may be embedded inside the camera module 100 and the camera module 100 may be controlled by this separate controller. While, in FIG. 2, the controller 160 is shown in a state of being located on one side of the camera module 100, this is only exemplary and an embodiment of the present disclosure is not limited thereto.

The body 10 may include a front panel 11 forming a front surface of the body 10, a side panel 12 forming a side surface of the body 10, and an upper panel 14 forming an upper surface of the body 10. Here, a rear panel forming a rear surface of the main body 10 may be located.

An electrical compartment cover 17 covering the front of the electrical compartment 50 may be provided on a front upper part of the front panel 11, and a display module 40 may be mounted on the electrical compartment cover 17.

A camera cooling fan 200 may be installed on one side of the camera module 100, for example, on a rear side of the camera module 100. External air drawn in by the camera cooling fan 200 may cool the camera module 100.

The cooking chamber 20 is provided inside the main body 10 to have a box shape, the front of which is open. Cooking materials may be taken in and out of the cooking chamber 20 through the front of the cooking chamber 20 which is open.

The open front of the cooking chamber 20 is opened and closed by a door 30. The door 30 may be hinged to a lower part of the main body 10 so as to be rotatable with respect to the main body 10.

A door handle 31 that a user may grip is provided on an upper front surface of the door 30 such that the user may open and close the cooking chamber 20 by gripping the door handle 31.

The display module 40 that displays various operation information of the oven and allows the user to input operation commands may be mounted on the electrical compartment cover 17 provided on an upper front surface of the front panel 11.

As illustrated in FIG. 3, a heater 70 for heating cooking materials may be provided in the cooking chamber 20. The heater 70 may be an electric heater including an electric resistor.

In this case, the heater 70 is not limited to the electric heater and may be a gas heater that generates heat by burning gas. Thus, the oven may include an electric oven and a gas oven.

Figure 4:
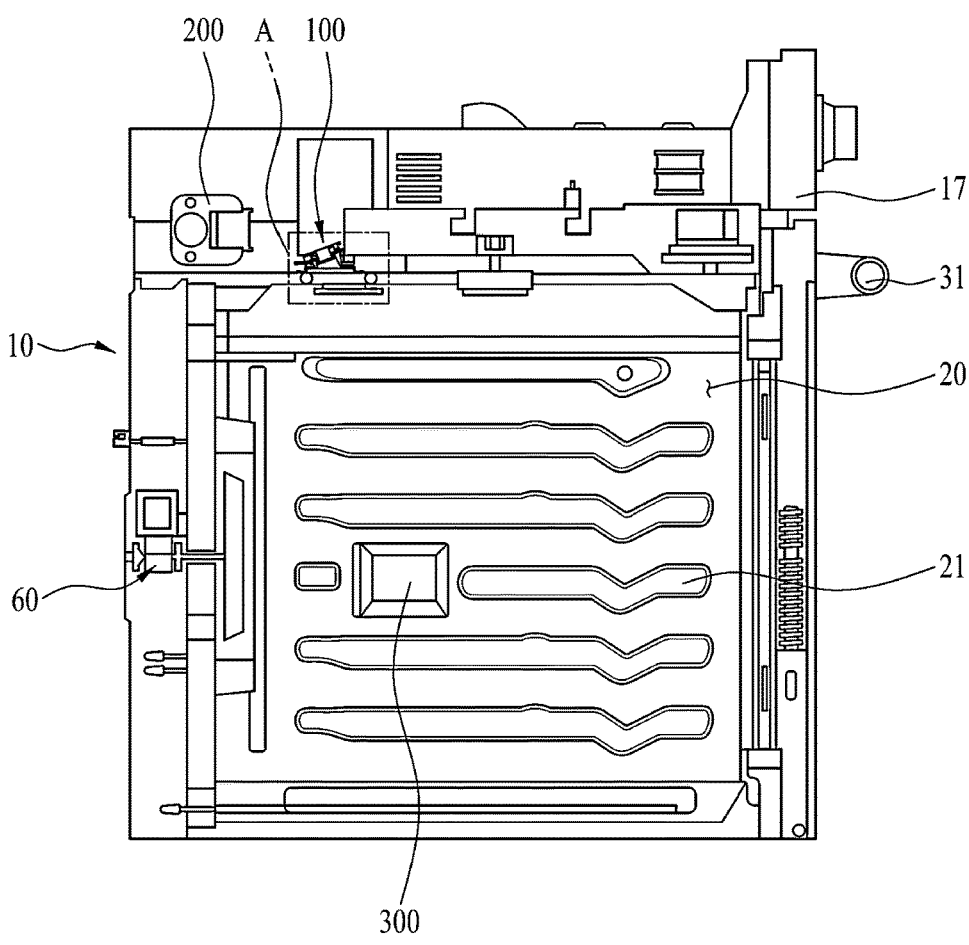
FIG. 4 is a side view showing the inside of a cooking appliance according to an embodiment of the present disclosure.

FIG. 4 is a side view illustrating the inside of a cooking appliance according to an embodiment of the present disclosure.

Referring to FIG. 4, a plurality of supports 21 may be provided on both side walls of the inside of the cooking chamber 20, and a rack (not shown) on which cooking materials may be placed may be mounted on the plurality of supports.

Accordingly, a plurality of divided spaces in the cooking chamber 20 may be utilized in various ways according to the intention of a user.

FIG. 4 illustrates an example in which five supports 21 are provided, and thus, five racks may be mounted on the supports 21.

A lighting unit 300 for illuminating the inside of the cooking chamber 20 may be positioned between the supports 21. The lighting unit 300 may provide lighting for capturing the inside of the cooking chamber 20 using the camera module 100.

In this case, the lighting unit 300 may be located at the center of the cooking chamber 20. That is, the lighting unit 300 may be located at an intermediate height based on the height of the cooking chamber 20. Accordingly, the lighting unit 300 may evenly illuminate the inside of the cooking chamber 20. Since external light may enter a front portion of the cooking chamber 20 through the door, the lighting unit 300 may be located at a rear side of the main body 10.

Meanwhile, a circulator 60 may be installed at the rear of the cooking chamber 20 to circulate air in the cooking chamber 20 so that cooking materials are evenly heated.

Figure 5:
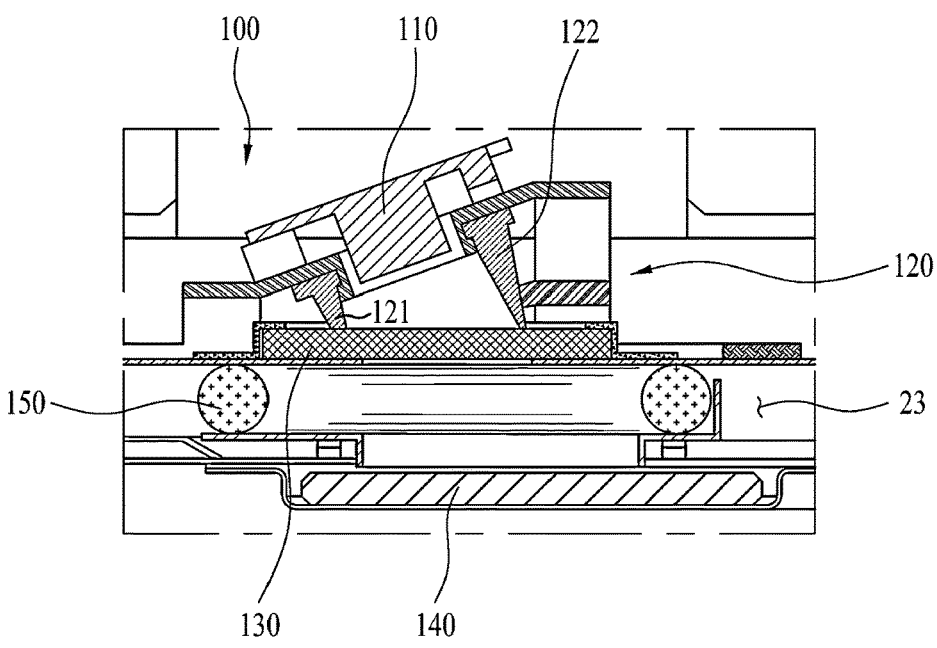
FIG. 5 is an enlarged view of part A of FIG. 4.

FIG. 5 is an enlarged view of part A of FIG. 4.

FIG. 5 illustrates an enlarged view of the camera module 100. Referring to FIG. 5, the camera module 100 includes a camera 110 that generates a captured image by capturing the position of a rack on which cooking materials inside the cooking chamber 20 are placed.

The camera 110 may estimate the position of the rack on which the cooking material is placed from the captured image.

As mentioned above, control of operation of the camera 110 and/or estimation of the position of the rack may be performed by the controller (or MCU) 160 for controlling the cooking appliance, installed in the electrical compartment 50, or by a separate controller (not shown) installed inside the camera module 100. Hereinafter, the control operation of the camera 110 will be exemplarily described as being performed by the controller 160.

In this way, under control of the controller 160, the camera 110 may capture the position of the rack on which cooking materials inside the cooking chamber 20 are placed to generate a captured image and estimate the position of the rack on which the cooking material is placed from the captured image.

In this case, the controller 160 may set at least one of an angle of view or a focus of the camera 110 according to the estimated position of the rack. That is, the controller 160 may set the camera 110 to an angle of view suitable for the estimated position of the rack and focus the camera 110 on the estimated position of the rack.

The camera module 100 may be installed in the electrical compartment 50 above the cooking chamber 20. The electrical compartment 50 may be spatially separated from the cooking chamber 20. FIG. 5 illustrates a state in which the electrical compartment 50 in which the camera module 100 is installed is separated from the cooking chamber 20 by a space 23. A blocking material for blocking heat may be positioned in the separated space 23.

In this way, the camera module 100 is provided on an upper wall 14 of the cooking chamber 20 so as to capture the interior of the cooking chamber 20.

The position of the camera 110 may be fixed by a bracket 120. The bracket 120 may include a first support 121 and a second support 122 for forming an appropriate inclination angle of the camera 110.

In addition, a first glass 140 for blocking heat inside the cooking chamber 20 from being transferred to the camera 110 and a second glass 130 disposed between the camera 110 and the first glass 140, for blocking heat from being transferred to the camera 110, may be provided on a lower side of the camera 110.

Since the camera module 100 is disposed inside the electrical compartment 50, the temperature of the camera module 100 may increase due to heat generated from electrical components inside the electrical compartment 50. In addition, since the electrical compartment 50 in which the camera module 100 is disposed is provided above the cooking chamber 20, the temperature of the camera module 100 may increase even by heat generated in the cooking chamber 20.

When the temperature of the camera module 100 increases, a malfunction may occur in the camera 110 included in the camera module 100, and image quality may deteriorate. Accordingly, the camera cooling fan (200, see FIG. 4) may be provided on one side of the camera module 100 to cool the camera module 100. The cooling fan 200 may be installed at the rear of the main body 10.

Therefore, as mentioned above, glasses 130 and 140 including the first glass 140 and the second glass 130 provided in plurality may be disposed under the camera module 100. The first glass 140 may be fixed to glass brackets so as to be disposed on upper and lower surfaces of the upper wall 14, and the second glass 130 may be fixed to a glass holder disposed adjacent to a lower portion of the camera module 100.

A heat reflection coating layer may be provided on either side of each of the first glass 140 and the second glass 130, or the heat reflection coating layer may be provided on both sides of each of the first glass 140 and the second glass 130. That is, the first glass 140 and the second glass 130 may be formed of heat reflection glass.

A space between the first glass 130 and the second glass 140 may be sealed by a gasket 150.

Figure 9:
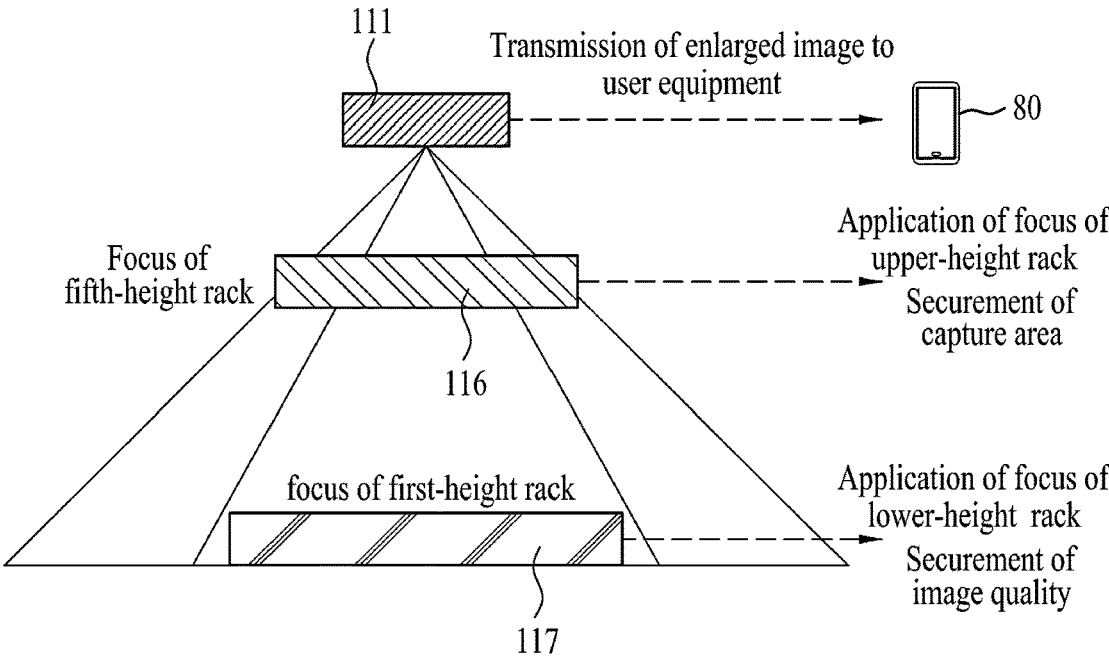
FIG. 9 is a diagram illustrating an image actually captured by a camera of a cooking appliance according to an embodiment of the present disclosure.

Meanwhile, the camera module 100 or the controller 160 may transmit the captured image to a user equipment (80, see FIG. 9).

The controller 160 may estimate the position of a rack on which a cooking material is placed based on image recognition using captured images.

In addition, the controller 160 may estimate the position of the rack on which a cooking material is placed using a lighting reflection signal from among the captured images. That is, the controller 160 may estimate the position of the rack on which a cooking material is placed using the position of the lighting unit 300 and surrounding images.

A detailed operation of the camera module 100 or the controller 160 will be described later.

Figure 6:
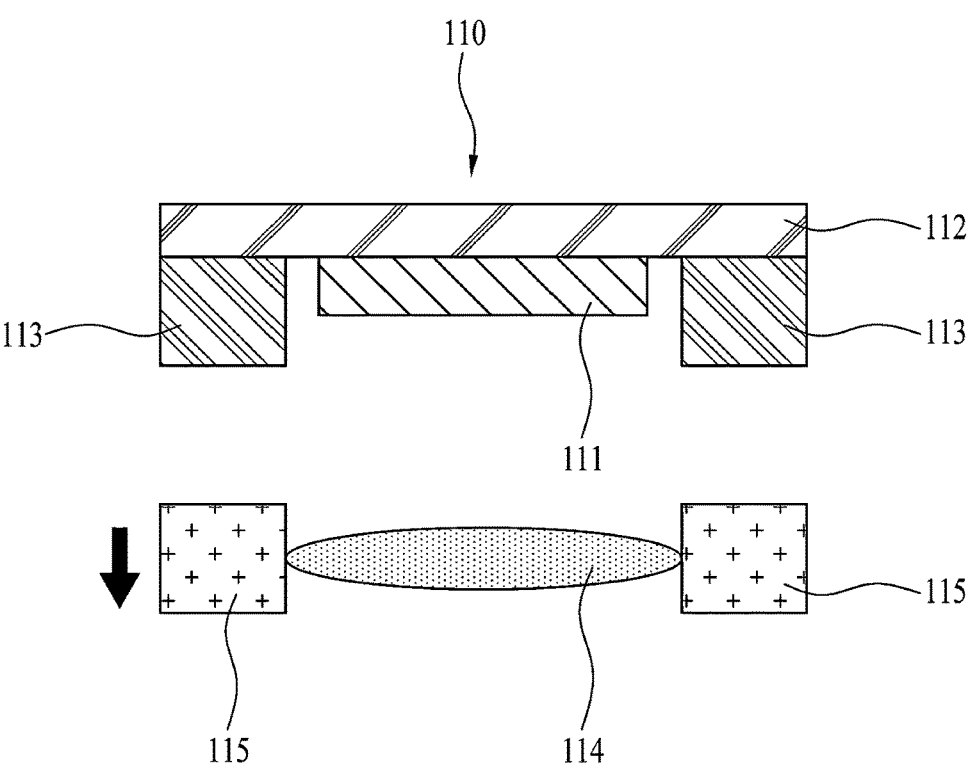
FIGS. 6 and 7 are cross-sectional views schematically illustrating an operation of a camera of a cooking appliance according to an embodiment of the present disclosure.
Figure 7:
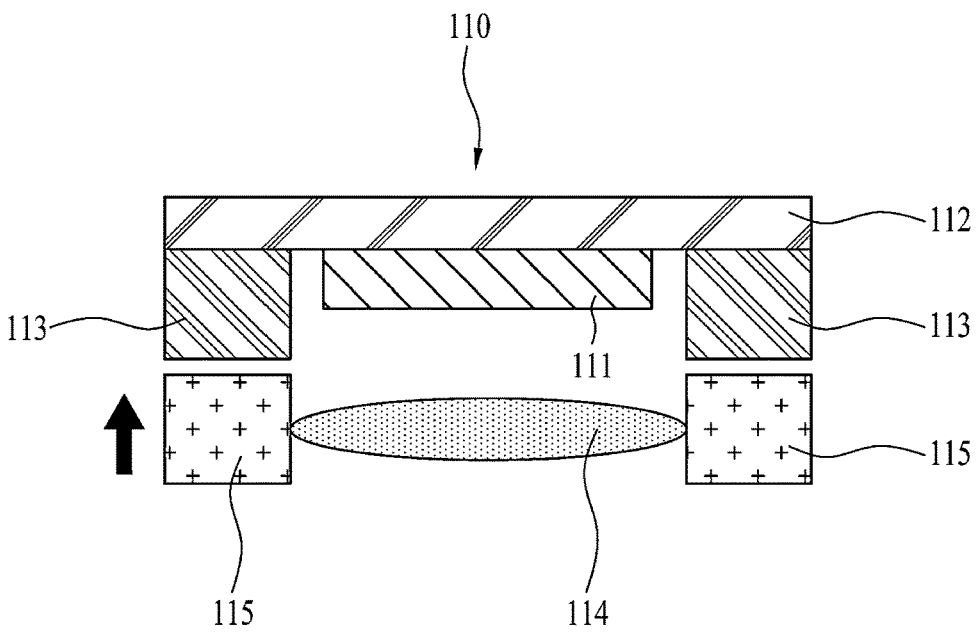

FIGS. 6 and 7 are cross-sectional views schematically illustrating an operation of a camera of a cooking appliance according to an embodiment of the present disclosure.

Referring to FIGS. 6 and 7, the controller 160 may set at least one of an angle of view or a focus of the camera 110 according to the estimated position of the rack based on image recognition using captured images.

For example, if the estimated position of the rack based on the image recognition using the captured images is a first height, which is the lowest position in the cooking chamber 20, a sensor unit 111 of the camera 110 may be moved away from a lens 114 as illustrated in FIG. 6.

Accordingly, the camera 110 may clearly capture cooking materials placed on the rack located at the first height, which is a relatively distant location, by narrowing an angle of view of the camera 110. That is, when the position of the rack is at the first height, the lens 114 moves away from the sensor unit 111 to secure image quality.

In this way, the sensor unit 111 may be fixed to a fixing plate 112 in the camera 110, and magnets 113 may be positioned at both ends of the fixing plate 112. In addition, the lens 114 may be located at a position opposite to the sensor unit 111, and coils 115 may be provided at both ends of the lens 114. Accordingly, the position of the lens 114 may move relative to the sensor unit 111 by action of the magnets 113 and the coils 115.

On the other hand, when the estimated position of the rack based on image recognition using the captured images is a fifth height, which is the highest position in the cooking chamber 20, the sensor unit 111 of the camera 110 may move closer to the lens 114, as illustrated in FIG. 7. Accordingly, a capture area may be sufficiently secured. That is, when the position of the rack is the fifth height, the lens 114 moves closer to the sensor unit 111 to secure a capture area.

FIG. 9 is a diagram schematically illustrating image characteristics according to the position of a rack of a cooking appliance according to an embodiment of the present disclosure.

An upper part of FIG. 9 illustrates the position of an image sensor 111, and the lower part thereof illustrates the positions of a fifth-height rack 116 and a first-height rack 117.

As described above, the camera 110 may sufficiently secure a capture area by widening an angle of view in the uppermost fifth rack 116. Along therewith, the camera 110 may focus on an upper position.

In addition, the camera 110 may capture a corresponding rack by narrowing an angle of view in the lowermost first-height rack 117. Along therewith, the camera 110 may focus on a lower position. Accordingly, the quality of images may be secured.

As such, the camera 110 may have an automatic focus capability and may optically change an angle of view.

When a capture area is adjusted by simply applying a wide angle to an image without optically adjusting the angle of view as described above, pixels in the lower position may decrease during enlargement, resulting in deterioration in image quality. Such deterioration in image quality may be problematic when an image is transmitted to the user equipment 80.

Figure 8:
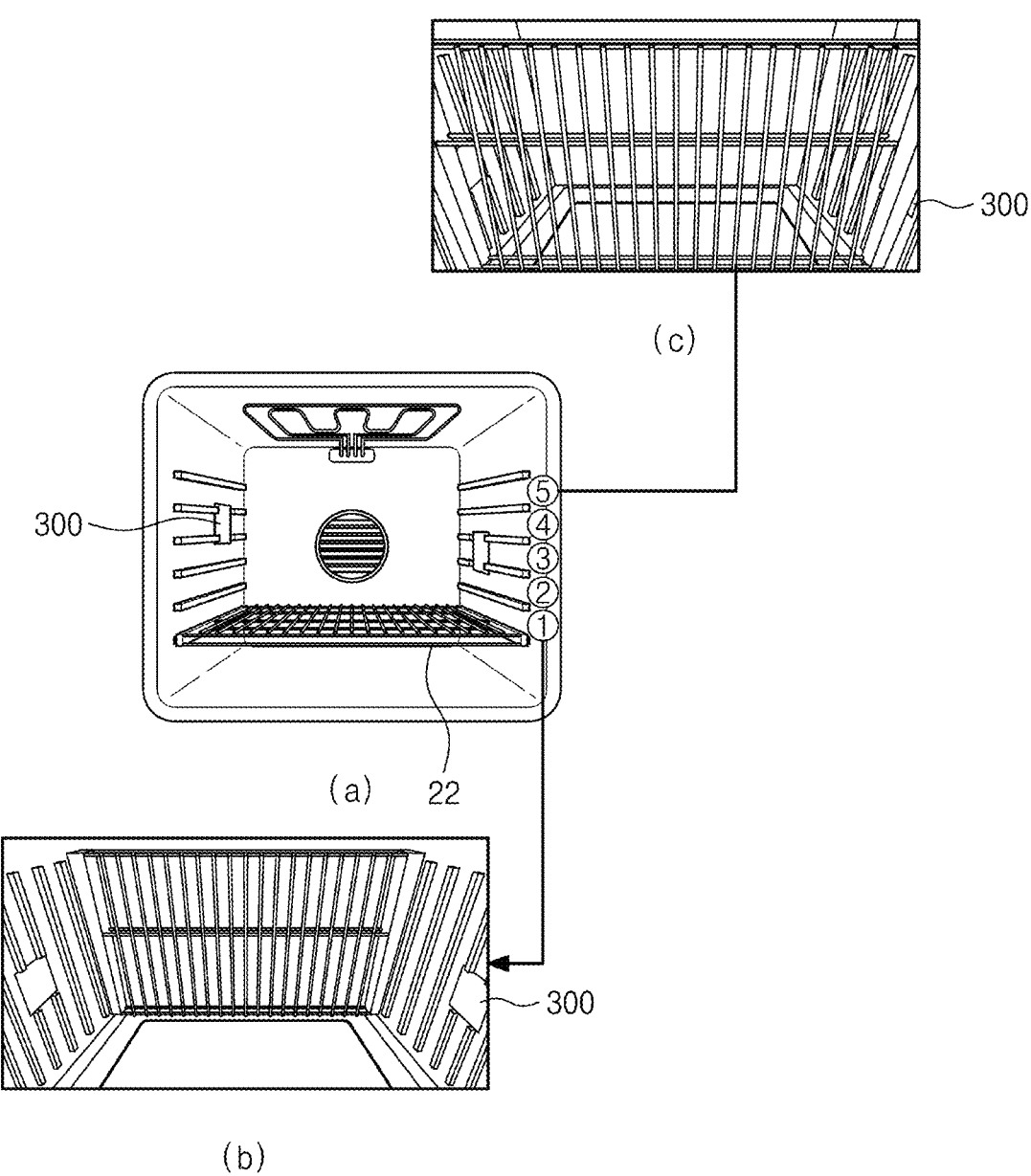
FIG. 8 is a diagram schematically illustrating image characteristics according to the position of a rack of a cooking appliance according to an embodiment of the present disclosure.

FIG. 8 is a diagram illustrating an image actually captured by a camera of a cooking appliance according to an embodiment of the present disclosure.

Referring to FIG. 8, an image (a) of the inside of the cooking chamber 20 and images captured according to the estimated positions of a rack are illustrated. Here, FIG. 9(a) illustrates an image of a side portion of the inside of the cooking chamber. According to the height of the rack, ①, ②, ③, ④, and ⑤ are marked from a low position to a high position.

FIG. 8(b) illustrates an image corresponding to FIG. 6 when the rack is located at the first height. In addition, FIG. 8(c) illustrates an image corresponding to FIG. 7 when the rack is located at the fifth height.

Referring to the images of FIGS. 8(b) and 8(c), it may be appreciated that the sizes of images have been edited according to the position of the lighting unit 300. The images at the location of the lighting unit 300 exhibit different characteristics. For example, reflection images caused by the lighting unit 300 may characteristically appear. Therefore, the position of the rack may be estimated based on image recognition using such characteristics of the images.

Figure 10:
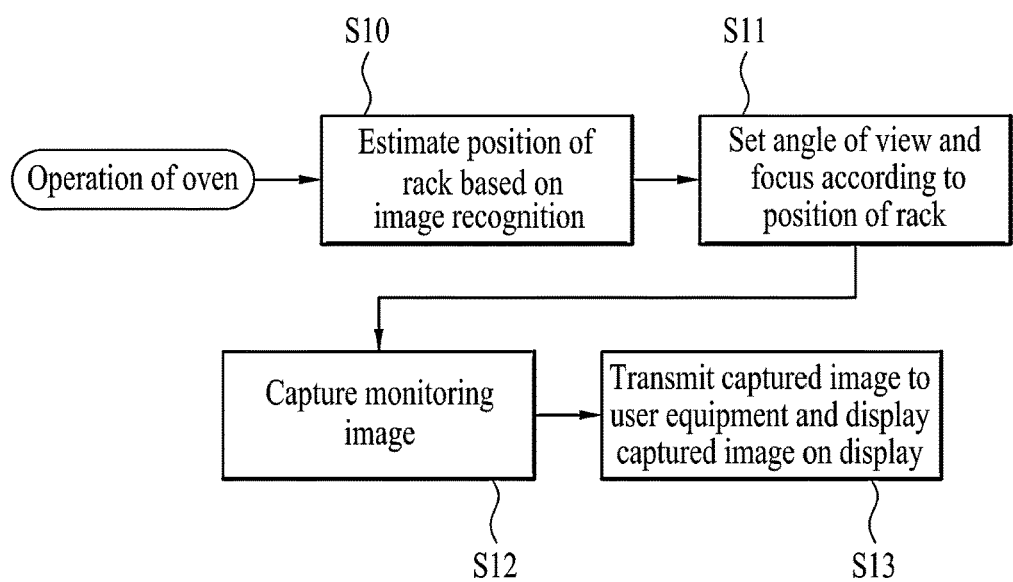
FIG. 10 is a flowchart illustrating a process of controlling a cooking appliance according to an embodiment of the present disclosure.

FIG. 10 is a flowchart illustrating a process of controlling a cooking appliance according to an embodiment of the present disclosure.

Hereinafter, the process of controlling the cooking appliance according to an embodiment of the present disclosure will be briefly described with reference to FIG. 10.

First, the cooking appliance (oven) according to an embodiment of the present disclosure starts to operate, and the position of a rack may be estimated based on image recognition (S10).

In this case, as described above, the controller 160 may estimate the position of the rack on which a cooking material is placed using a lighting reflection signal from captured images. That is, the controller 160 may estimate the position of the rack on which cooking a material is placed using the position of the lighting unit 300 and surrounding images.

In this way, the position of the rack may be estimated through image analysis of a characteristic region in the cooking chamber 20. In this case, image analysis-based automatic setting and a preset optimal value may be applied.

Then, an angle of view and a focus of the camera 110 may be set according to the estimated position of the rack (S11).

Next, a monitoring image of the cooking materials may be captured in a state in which the angle of view and the focus of the camera 110 are adjusted to be suitable for the corresponding rack (S12).

An actual original image captured through the camera 110 is an image of a wide capture range including an internal structure and a lighting unit by the angle of view of the camera 110, and a monitoring image displayed on the user equipment 80 or the display 40 may be provided in a state in which only a required area in which the cooking material is located is edited.

Thereafter, the captured image may be transmitted to the user equipment 80 (S13) and may be displayed on the display of the user equipment 80. In some cases, the corresponding image may also be displayed on the display module 40 of the oven.

Figure 11:
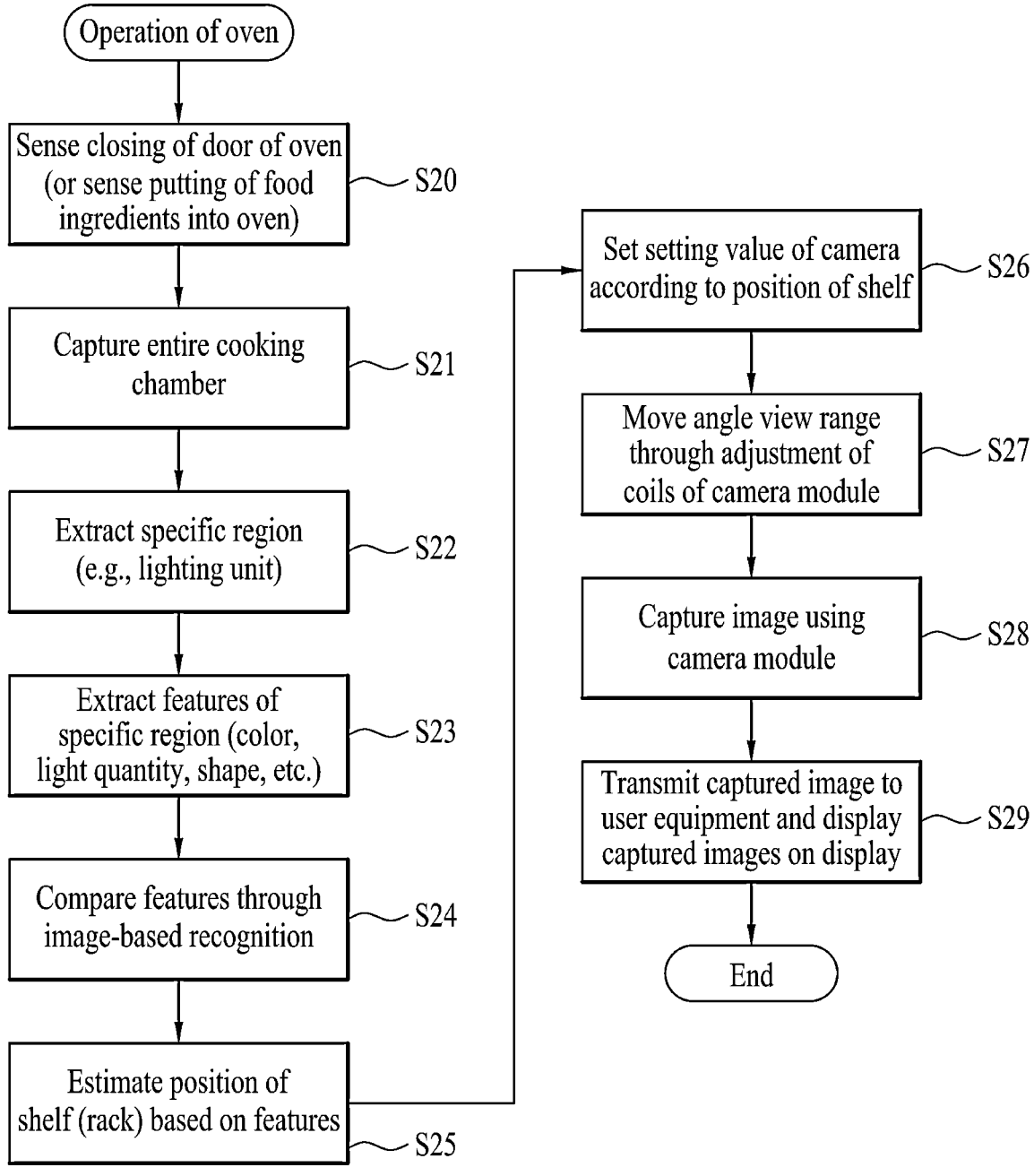
FIG. 11 is a flowchart illustrating in detail a process of controlling a cooking appliance according to an embodiment of the present disclosure.

FIG. 11 is a detailed flowchart illustrating a process of controlling a cooking appliance according to an embodiment of the present disclosure.

Hereinafter, the process of controlling the cooking appliance according to an embodiment of the present disclosure will be described in detail with reference to FIG. 11.

First, an oven starts to operate and start of cooking may be sensed (S20). The start of cooking may be sensed by sensing the closing of the door 30 of the oven or by sensing, by another sensor, that food ingredients are put into the oven.

Then, the position of a rack on which the food ingredients (cooking materials) are put may be estimated. The process (S10) of estimating the position of the rack described with reference to FIG. 10 may correspond to steps S21 to S25 below.

As an embodiment, the process of estimating the position of the rack includes capturing the entire cooking chamber to obtain captured images (S21), extracting a specific region from the captured images to obtain an extracted image (S22 and S23), comparing the extracted image with a previously extracted image (S24), and estimating the position of the shelf (rack) from the comparison result (S25).

Specifically, extracting a specific region from the captured images to obtain an extracted image (S22 and S23) may include extracting the specific region from the captured images (S22). In this case, the specific area may be the lighting unit 300 inside the cooking chamber 20. Thereafter, features of the specific region may be extracted (S23). The features of the specific region may be, for example, at least one of color, light quantity, or shape.

Thereafter, in comparing the extracted image with the previously extracted image (S24), the previously extracted image may be, for example, an image extracted during an oven manufacturing process. The position of the shelf (rack) may be estimated by comparing the extracted image with the previously extracted image (S25).

Next, a setting value of the camera 110 may be set according to the position of the estimated shelf (rack) (S26). For example, at least one of an angle of view or a focus of the camera 110 may be set.

In this way, an angle view range may be moved by adjusting the coils of the camera 110 according to at least one of the set angle of view or the set focus of the camera 110 (S27).

In this way, an image may be captured using the camera module 100 under the adjusted capture condition through movement (S28).

Thereafter, the captured image may be transmitted to the user equipment 80 and may be displayed on the display of the user equipment 80 (S29). In some cases, the corresponding image may also be displayed on the display module 40 of the oven.

As described above, according to an embodiment of the present disclosure, the position of the shelf (rack) may be estimated through image-based feature recognition of the cooking chamber of the cooking appliance.

In addition, at least one of an angle of view and a focus of the camera may be set to match the estimated position of the shelf (rack).

Thereafter, the camera may operate with the set angle of view and the set focus to obtain an image. The image may be transmitted to the user equipment or may be displayed on the display of the cooking appliance.

Therefore, usability may be improved compared to an existing image monitoring function of a fixed angle of view and focus method. Accordingly, an optimal image according to the position of the shelf (rack) may be provided.

In addition, the shelf (rack) on which cooking materials (food ingredients) are located may be effectively estimated.

In addition, an accurate image may be obtained regardless of cooking materials (food ingredients) by recognizing an image of the lighting unit that is not affected by the rack (shelf).

The above description is merely illustrative of the technical idea of the present disclosure. Those of ordinary skill in the art to which the present disclosure pertains will be able to make various modifications and variations without departing from the essential characteristics of the present disclosure.

Therefore, embodiments disclosed in the present disclosure are not intended to limit the technical idea of the present disclosure, but to describe, and the scope of the technical idea of the present disclosure is not limited by such embodiments.

The scope of protection of the present disclosure should be interpreted by the claims below, and all technical ideas within the scope equivalent thereto should be construed as being included in the scope of the present disclosure.

INDUSTRIAL APPLICABILITY

According to the present disclosure, a cooking appliance capable of estimating the position of a shelf (rack) of a cooking chamber of the cooking appliance and a control method therefor may be provided.

The invention claimed is:

1. A cooking appliance, comprising:

a main body;

a cooking chamber provided inside the main body to be opened on one side and including a plurality of supports supporting a position of a rack on which a cooking material is placed;

a camera module provided on the cooking chamber to estimate the position of the rack on which the cooking material is placed and including a camera configured to generate a captured image by capturing the position of the rack on which the cooking material inside the cooking chamber is placed;

a cooling fan disposed on one side of the camera module and configured to cool the camera module by drawing in external air; and a controller configured to control the camera module, wherein the controller is configured to estimate the position of the rack on which the cooking material is placed based on image recognition using an image captured for a specific region, and wherein the specific region is a lighting unit inside the cooking chamber.

2. The cooking appliance of claim 1, wherein the camera module is installed in an electrical compartment on the cooking chamber, and the electrical compartment is spatially separated from the cooking chamber.

3. The cooking appliance of claim 1, further comprising:

a first glass provided on an upper wall of the cooking chamber to cause the camera module to capture an inside of the cooking chamber and configured to block heat inside the cooking chamber from being transferred to the camera; and a second glass disposed between the camera and the first glass and configured to block heat transferred to the camera.

4. The cooking appliance of claim 3, wherein a space between the first glass and the second glass is sealed by a gasket.

5. The cooking appliance of claim 1, wherein the controller is configured to transmit the captured image to a user equipment.

6. The cooking appliance of claim 1, wherein the controller is configured to estimate the position of the rack on which the cooking material is placed using a lighting reflection signal from among the captured image.

7. The cooking appliance of claim 1, wherein the controller is configured to sets at least one of an angle of view or a focus of the camera according to the estimated position of the rack.

8. A cooking appliance, comprising:

a main body;

a cooking chamber provided inside the main body to be opened on one side and including a plurality of supports supporting a position of a rack on which cooking material is placed;

a camera module provided on the cooking chamber to estimate the position of the rack on which the cooking material is placed and including a camera configured to generate a captured image by capturing the position of the rack on which the cooking material inside the cooking chamber is placed; and a controller configured to control the camera module, wherein the controller is configured to estimate the position of the rack on which the cooking material is placed based on image recognition using an image captured for a specific region and set at least one of an angle of view or a focus of the camera according to the estimated position of the rack, and wherein the specific region is a lighting unit inside the cooking chamber.

9. The cooking appliance of claim 8, wherein the controller is configured to transmit the captured image to a user equipment.

10. The cooking appliance of claim 8, wherein the controller is configured to estimate the position of the rack on which the cooking material is placed based on image recognition using the captured image.

11. The cooking appliance of claim 8, wherein the controller is configured to estimate the position of the rack on which the cooking material is placed using a lighting reflection signal from among the captured image.

12. A cooking appliance, comprising:

a main body;

a cooking chamber provided inside the main body to be opened on one side and including a plurality of supports supporting a position of a rack on which a cooking material is placed;

a camera module provided in an electrical compartment, spatially separated from the cooking chamber such that heat inside of the cooking chamber is not transferred, to estimate the position of the rack on which the cooking material is placed and including a camera configured to generate a captured image by capturing the position of the rack on which the cooking material inside the cooking chamber is placed;

a cooling fan disposed on one side of the camera module and configured to cool the camera module by drawing in external air; and a controller configured to control the camera module, wherein the controller is configured to estimate the position of the rack on which the cooking material is placed based on image recognition using an image captured for a specific region and set at least one of an angle of view or a focus of the camera according to the estimated position of the rack, and wherein the specific region is a lighting unit inside the cooking chamber.

13. The cooking appliance of claim 12, further comprising:

a first glass provided on an upper wall of the cooking chamber to cause the camera module to capture an inside of the cooking chamber and configured to block heat inside the cooking chamber from being transferred to the camera; and a second glass disposed between the camera and the first glass and configured to block heat transferred to the camera.

14. The cooking appliance of claim 13, wherein a space between the first glass and the second glass is sealed by a gasket.

15. The cooking appliance of claim 12, wherein the controller is configured to estimate the position of the rack on which the cooking material is placed using a lighting reflection signal from among the captured image.

* * * * *